(12) United States Patent
Sakurai et al.

(10) Patent No.: US 9,774,760 B2
(45) Date of Patent: Sep. 26, 2017

(54) IMAGE READING DEVICE, IMAGE FORMING APPARATUS, METHOD FOR CONTROLLING IMAGE READING, AND NON-TRANSITORY COMPUTER-READABLE MEDIUM

(71) Applicants: Takanori Sakurai, Kanagawa (JP); Kenichi Satoh, Kanagawa (JP)

(72) Inventors: Takanori Sakurai, Kanagawa (JP); Kenichi Satoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/156,693

(22) Filed: May 17, 2016

(65) Prior Publication Data
US 2016/0366303 A1  Dec. 15, 2016

(30) Foreign Application Priority Data
Jun. 10, 2015  (JP) ................. 2015-117396

(51) Int. Cl.
| H04N 1/04 | (2006.01) |
| H04N 1/48 | (2006.01) |
| H04N 1/23 | (2006.01) |
| H04N 1/047 | (2006.01) |

(52) U.S. Cl.
CPC ............ *H04N 1/484* (2013.01); *H04N 1/047* (2013.01); *H04N 1/233* (2013.01); *H04N 1/48* (2013.01)

(58) Field of Classification Search
CPC ............... G03B 17/50; H04N 1/00204; H04N 1/00236; H04N 1/00241; H04N 1/401; H04N 1/48; H04N 1/60; H04N 2201/0015; H04N 2201/3335

USPC .......... 396/429, 225, 30; 358/448, 462, 474, 358/486
See application file for complete search history.

(56) References Cited

U.S. PATENT DOCUMENTS 5,305,122 A * 4/1994 Hayashi ................. H04N 1/486
358/448
5,625,526 A * 4/1997 Watanabe ............... G03F 7/707
361/234

(Continued)

FOREIGN PATENT DOCUMENTS

| JP | 2000-228712 | 8/2000 |
| JP | 3563938 | 6/2004 |
| JP | 2010-118819 | 5/2010 |

*Primary Examiner* — Negussie Worku
(74) *Attorney, Agent, or Firm* — Oblon, McClelland, Maier & Neustadt, L.L.P.

(57) ABSTRACT

An image reading device includes: an image reading unit configured to, in a process of reciprocating relative to a fixed document, read a document image using one or a plurality of reading colors, and when a plurality of reading colors are used, read the document image while successively switching the reading colors in a process of moving; a moving unit configured to move the image reading unit; a moving speed changing unit configured to change moving speeds of the image reading unit in an outgoing path and a return path based on a number "N" (where N is a positive integer) of the reading colors by the image reading unit; and a reading color number changing unit configured to change reading color numbers of the image reading unit in the outgoing path and the return path based on the number "N" of the reading colors.

9 Claims, 8 Drawing Sheets

(56) References Cited

U.S. PATENT DOCUMENTS

| | | | |
|---|---|---|---|
| 6,198,550 B1* | 3/2001 | Toyoda | H04N 1/486 |
| | | | 358/506 |
| 6,380,539 B1* | 4/2002 | Edgar | H04N 1/00795 |
| | | | 250/339.05 |
| 6,580,528 B1 | 6/2003 | Imoto et al. | |
| 7,006,260 B2* | 2/2006 | Sato | H04N 1/00236 |
| | | | 358/448 |
| 7,173,234 B2* | 2/2007 | Hiromatsu | H04N 1/02865 |
| | | | 250/208.1 |
| 2002/0015196 A1 | 2/2002 | Kitamura et al. | |
| 2002/0075529 A1* | 6/2002 | Sato | H04N 1/00236 |
| | | | 358/505 |
| 2004/0037585 A1* | 2/2004 | Ishiguro | H04N 1/506 |
| | | | 399/100 |
| 2008/0239416 A1* | 10/2008 | Kato | H04N 1/00909 |
| | | | 358/498 |
| 2010/0001197 A1* | 1/2010 | Aoyama | A61B 6/06 |
| | | | 250/370.09 |
| 2010/0028049 A1* | 2/2010 | Wakamoto | G03G 15/04036 |
| | | | 399/221 |
| 2010/0298977 A1* | 11/2010 | Fahn | G05D 1/0246 |
| | | | 700/259 |
| 2012/0086312 A1* | 4/2012 | Kobayashi | H03H 3/10 |
| | | | 310/348 |
| 2013/0027758 A1* | 1/2013 | Shimizu | H04N 1/0473 |
| | | | 358/475 |
| 2013/0070316 A1* | 3/2013 | Ohara | H04N 1/00997 |
| | | | 358/475 |
| 2013/0250377 A1* | 9/2013 | Kitai | H04N 1/00023 |
| | | | 358/504 |
| 2013/0253078 A1* | 9/2013 | Jothimurugesan | B01J 29/061 |
| | | | 518/715 |
| 2016/0126677 A1* | 5/2016 | Yu | H01R 13/6474 |
| | | | 439/607.23 |

* cited by examiner (a)

(b)

(a) N=1

(b) N=2

(c) N=X

… (1)

IMAGE READING DEVICE, IMAGE FORMING APPARATUS, METHOD FOR CONTROLLING IMAGE READING, AND NON-TRANSITORY COMPUTER-READABLE MEDIUM

CROSS-REFERENCE TO RELATED APPLICATION

The present application claims priority under 35 U.S.C. §119 to Japanese Patent Application No. 2015-117396, filed Jun. 10, 2015. The contents of which are incorporated herein by reference in their entirety.

BACKGROUND OF THE INVENTION

1. Field of the Invention

The present invention relates to an image reading device, an image forming apparatus, a method for controlling image reading, and a non-transitory computer-readable medium.

2. Description of the Related Art

An image reading device has been known that mounts a document on a contact glass, moves a carriage below the contact glass, and thereby reads an image from the document.

Japanese Unexamined Patent Application No. 2010-118819 discloses such an image reading device that, in order to read a document at high speed, reads images from a document at half resolution in positions displaced in a sub-scanning direction by one line each in an outgoing path and a return path in the sub-scanning direction, combines the images for each line, and thereby obtains image data of the document.

However, the image reading device disclosed in Japanese Unexamined Patent Application No. 2010-118819 must perform reading while displacing a reading line in the outgoing path and a reading line in the return path precisely and has a problem in that when unexpected deviation occurs, image quality degrades when the images of the outgoing path and the return path are combined with each other.

SUMMARY OF THE INVENTION

According to one aspect of the present invention, there is provided an image reading device including: an image reading unit configured to, in a process of reciprocating relative to a fixed document, read a document image using one or a plurality of reading colors, and when a plurality of reading colors are used, read the document image while successively switching the reading colors in a process of moving; a moving unit configured to move the image reading unit; a moving speed changing unit configured to change moving speeds of the image reading unit in an outgoing path and a return path based on a number "N" (where N is a positive integer) of the reading colors by the image reading unit; and a reading color number changing unit configured to change reading color numbers of the image reading unit in the outgoing path and the return path based on the number "N" of the reading colors.

According to another aspect of the present invention, there is provided a method for controlling image reading performed by an image reading device, the image reading device including: an image reading unit configured to, in a process of reciprocating relative to a fixed document, read a document image using one or a plurality of reading colors, and when a plurality of reading colors are used, read the document image while successively switching the reading colors in a process of moving; and a moving unit configured to move the image reading unit, the method including: changing moving speeds of the image reading unit in an outgoing path and a return path based on a number "N" (where N is a positive integer) of the reading colors by the image reading unit; and changing reading color numbers of the image reading unit in the outgoing path and the return path based on the number "N" of the reading colors.

According to still another aspect of the present invention, there is provided a non-transitory computer-readable medium comprising computer readable program codes, performed by an image reading device, the image reading device including: an image reading unit configured to, in a process of reciprocating relative to a fixed document, read a document image using one or a plurality of reading colors, and when a plurality of reading colors are used, read the document image while successively switching the reading colors in a process of moving; and a moving unit configured to move the image reading unit, the program codes when executed causing the image reading device to execute: changing moving speeds of the image reading unit in an outgoing path and a return path based on a number "N" (where N is a positive integer) of the reading colors by the image reading unit; and changing reading color numbers of the image reading unit in the outgoing path and the return path based on the number "N" of the reading colors.

The above and other objects, features, advantages and technical and industrial significance of this invention will be better understood by reading the following detailed description of presently preferred embodiments of the invention, when considered in connection with the accompanying drawings.

Figure 1:
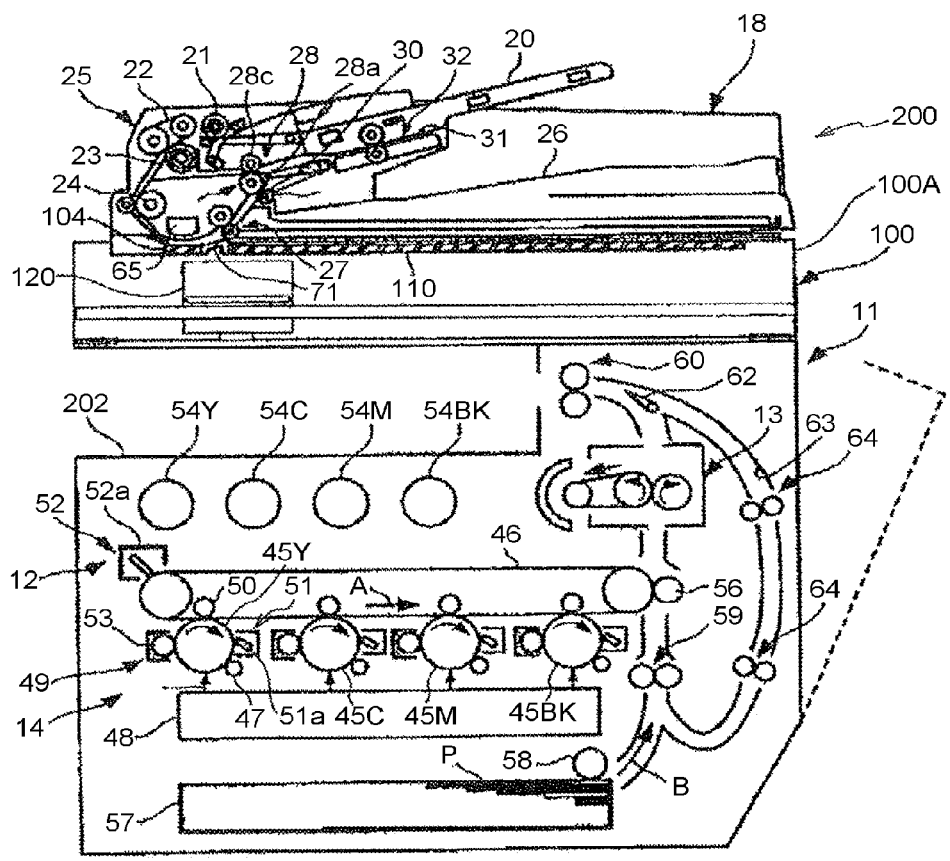
FIG. 1 is a sectional view of a schematic configuration of an image forming apparatus according to an embodiment of the present invention.

The accompanying drawings are intended to depict exemplary embodiments of the present invention and should not be interpreted to limit the scope thereof. Identical or similar

DETAILED DESCRIPTION OF THE PREFERRED EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result. An embodiment of the present invention will be described in detail below with reference to the drawings.

The present invention has an object to read images at high speed while reducing degradation of image quality.

The present invention includes the following configuration in order to read images at high speed while reducing degradation of image quality.

Specifically, an image reading device according to the present invention includes an image reading unit configured to, in a process of reciprocating relative to a fixed document, read a document image using one or a plurality of reading colors, and when a plurality of reading colors are used, read the document image while successively switching the reading colors in a process of moving, a moving unit that moves the image reading unit, a moving speed changing unit configured to change moving speeds of the image reading unit in an outgoing path and a return path based on a number "N" (where N is a positive integer) of the reading colors by the image reading unit, and a reading color number changing unit configured to change reading color numbers of the image reading unit in the outgoing path and the return path based on the number "N" of the reading colors.

The above configuration can read images at high speed while reducing degradation of image quality.

The following describes features of the present invention in detail with reference to the drawings.

First Embodiment

The following describes an image forming apparatus according to a first embodiment of the present invention.

FIG. 1 is a sectional view of a schematic configuration of an image forming apparatus according to an embodiment.

This image forming apparatus 200 includes an image formation device 11 as an image formation unit and an image reading device 100 according to the present embodiment. The image forming apparatus 200 is a color copier that forms one image using four-color toner of yellow (Y), cyan (C), magenta (M), and black (BK). The image forming apparatus is not limited to this example and may include other components.

The image formation device 11 forms a toner image on a recording medium based on image data acquired by the image reading device 100. The image formation device 11 includes an image forming unit 12, a fixing device 13 that fixes the toner image on the recording medium formed by the image forming unit 12 onto the recording medium, and a recording medium conveying device 14 that conveys the recording medium toward the image forming unit 12.

The image forming apparatus 200 includes the image reading device 100 that reads a document image and an auto document feeder (ADF) 18 that feeds a document and has a function of a pressure plate that positions the document when it is closed. The auto document feeder 18 is arranged on the image reading device 100 in an openable and closable manner via a hinge mechanism.

The auto document feeder 18 includes a document mounting stand 20 that can mount a document bundle thereon and a pickup roller 21 that moves between a contact position being in contact with an upper surface of the document bundle mounted on the document mounting stand 20 to send out the document bundle and a separate position being separate from the document bundle.

The auto document feeder 18 includes a document conveying unit 25 including a paper feeding belt 22 that separates documents one by one from the document bundle sent out by the pickup roller 21 and conveys the documents toward a sub-contact glass 104 as a reading position, a reverse roller 23, and a conveying roller pair 24. Furthermore, the auto document feeder 18 includes a document discharge unit 29 including a conveying roller pair 27 and a document discharging roller pair 28 that discharge a document for which reading has ended at the reading position to a document discharging stand 26. The auto document feeder 18 is arranged on the image reading device 100 in an openable and closable manner and functions as a pressure plate that presses the document arranged on a contact glass 110.

The document discharging roller pair 28 includes a drive roller 28a and a driven roller 28b and a driven roller 28c that are in sliding contact with the drive roller 28a, and a switching claw 30 is provided near the document discharging roller pair 28. The switching claw 30 moves between a first switched position and a second switched position; when the switching claw 30 is switched to the first switched position, the drive roller 28a and driven roller 28b discharge the document to the document discharging stand 26.

When the switching claw 30 is switched to the second switched position, the drive roller 28a and the driven roller 28c convey the document to a switchback path 31

In the switchback path 31, a switchback roller pair 32 that can freely rotate forwardly and reversely is provided. A document conveyed to the switchback path 31 is conveyed in the rightward direction in FIG. 1 by the switchback roller pair 32 and is then conveyed to the conveying roller pair 24 via a reconveying path by the reverse drive of the switchback roller pair 32. Consequently, the document is reversed and conveyed to the reading position.

As is generally known, the image reading device 100 includes a housing 100A housing an optical system and the contact glass 110 and the sub-contact glass 104 that are arranged in the upper part of the housing 100A in a fixed manner.

In this image reading device 100, a closed document or a document such as a book is mounted on the contact glass 110, and the document is pressed by the auto document feeder 18, whereby the document can be read. The document automatically fed by the auto document feeder 18 is read at a reading position of the sub-contact glass 104.

The image forming unit 12 includes a first image bearer 45Y, a second image bearer 45C, a third image bearer 45M, and a fourth image bearer 45BK all of which are drum-shaped photoconductors. An intermediate transfer belt 46, or an endless belt, looped around a plurality of support rollers is arranged facing the first to the fourth image bearers 45Y to 45BK.

The first to the fourth image bearers 45Y to 45BK each are rotatingly driven clockwise in FIG. 1, and the intermediate transfer belt 46 is rotatingly driven in an arrow A direction in FIG. 1. In this situation, the first image bearer 45Y is charged to certain polarity by a charging roller 47.

An optical writing unit 48 emits a laser beam L optically modulated based on an image signal responsive to a result of reading the document. A charging surface of the first image bearer 45Y is irradiated with the laser beam L, whereby an electrostatic latent image is formed on the first image bearer 45Y, and this electrostatic latent image is changed into a visible image as a yellow toner image by a developing device 49.

A transfer voltage is applied to a primary transfer roller 50, and the toner image formed on the first image bearer 45Y is primarily transferred onto the intermediate transfer belt 46 that rotates in the arrow A direction in FIG. 1. Toner left after transfer adhering to the first image bearer 45Y after the toner image transfer is removed by an image bearer cleaning device 51.

In the image forming apparatus 200 of the present embodiment, an integral process cartridge is configured by the first image bearer 45Y, the charging roller 47 arranged therearound, the developing device 49, and the image bearer cleaning device 51.

The developing device 49 includes a developer container 53 that houses therein powdery toner, and the toner changes an electrostatic latent image into a visible image. When a toner amount in the developer container 53 decreases, toner is replenished from a toner bottle 54Y to the developer container 53.

The image bearer cleaning device 51 includes a cleaning container 51a that receives the toner removed from the first image bearer 45Y, and the toner in the cleaning container 51a is conveyed to a waste toner container by a toner conveyor. The toner is thus housed in the developer container 53, the toner bottle 54Y, the cleaning container 51a, and the waste toner container.

In a manner similar to the operation described above, a cyan toner image, a magenta toner image, and a black toner image are formed on the second image bearer 45C, the third image bearer 45M, and the fourth image bearer 45BK, respectively. These toner images are primarily transferred onto the intermediate transfer belt 46 onto which the yellow toner image has been transferred in a successively superimposed manner.

Also when respective toner amounts in developer containers of respective developing devices forming toner images on the second image bearer 45C, the third image bearer 45M, and the fourth image bearer 45BK decrease, toner is replenished from toner bottles 54C, 54M, and 54BK to the respective developer containers.

A superimposed toner image thus transferred onto the intermediate transfer belt 46 is secondarily transferred onto the recording medium by the action of a secondary transfer roller 56, and toner left after transfer adhering to the intermediate transfer belt 46 after the transfer is removed by a belt cleaning device 52. A cleaning container 52a of this cleaning device 52 also houses therein toner, and the toner is conveyed to the waste toner container.

The recording medium conveying device 14 is arranged below the intermediate transfer belt 46, and this recording medium conveying device 14 includes a paper feeding cassette 57 that houses therein recording media P that are recording paper or the like, a paper feeding roller 58 being in contact with the topmost recording medium P, and a registration roller pair 59.

The paper feeding cassette 57 is arranged in a paper tray 201, and the topmost recording medium P is sent out in an arrow B direction in FIG. 1 by the rotation of the paper feeding roller 58. The sent out recording medium P is conveyed to between the intermediate transfer belt 46 and the secondary transfer roller 56 arranged facing the intermediate transfer belt 46 with certain timing by the rotation of the registration roller pair 59.

When this recording medium P passes through between the intermediate transfer belt 46 and the secondary transfer roller 56, a transfer voltage is applied to the secondary transfer roller 56, whereby the superimposed toner image on the intermediate transfer belt 46 is secondarily transferred to the recording medium. The image forming unit 12 thus forms the toner image on the recording medium P.

The recording medium P on which the toner image has been formed passes through the fixing device 13, in which the toner image on the recording medium P formed by the image forming unit 12 is fixed on the recording medium P. The recording medium P on which the image has been fixed by the fixing device 13 is discharged to a paper ejection tray 202 by a paper ejection roller pair 60.

This paper ejection tray 202 is formed in between the image formation device 11 and the image reading device 100. In the first embodiment, the image forming apparatus 200 is an intra-body paper ejection type that opens between the image formation device 11 and the image reading device 100 on the downstream side of the paper ejection direction of the recording medium P by the paper ejection roller pair 60. A switching lever 62 is provided on the upstream side of the paper ejection roller pair 60, and this switching lever 62 is switched to a reverse path 63 when copying is performed on the back side of the recording medium P after copying on the front side of the recording medium ends.

Specifically, when a rear end of the recording medium P is nipped by the paper ejection roller pair 60, the paper ejection roller pair 60 is reversely driven, and the switching lever 62 is switched to a position that communicates with the reverse path 63, whereby the recording medium P is conveyed toward the reverse path 63.

A reverse roller pair 64 is provided in this reverse path 63, and the recording medium conveyed through the reverse path 63 by this reverse roller pair 64 is conveyed to the secondary transfer roller 56.

A reflective guide plate 65 is provided on the sub-contact glass 104, and this reflective guide plate 65 reflects reading light from a light source unit 40 described below. A guide plate 71 is provided in between the contact glass 110 and the sub-contact glass 104, and this guide plate 71 picks up the document having passed through the sub-contact glass 104 and guides the document toward the conveying roller pair 27.

A standard white plate 103 as a standard of white in image reading is arranged below the guide plate 71 (on the light source unit 40 side). Furthermore, a positioning surface that performs positioning of the document is formed on an end of the guide plate 71 on the contact glass 110 side.

Next, the following describes the image reading device 100.

Figure 2:
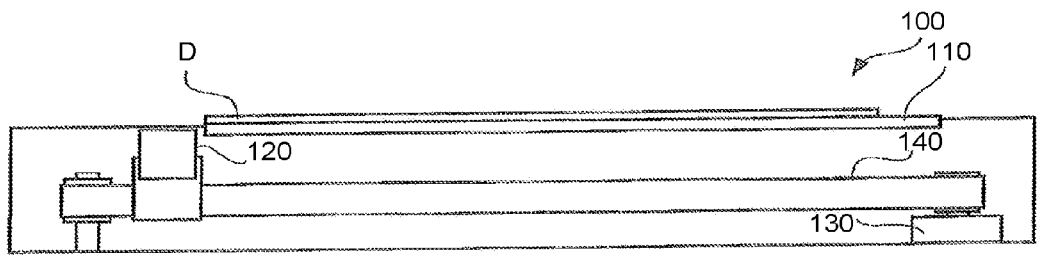
FIG. 2 is a sectional view of a configuration of an image reading device of the image forming apparatus according to the embodiment of the present invention.
Figure 3:
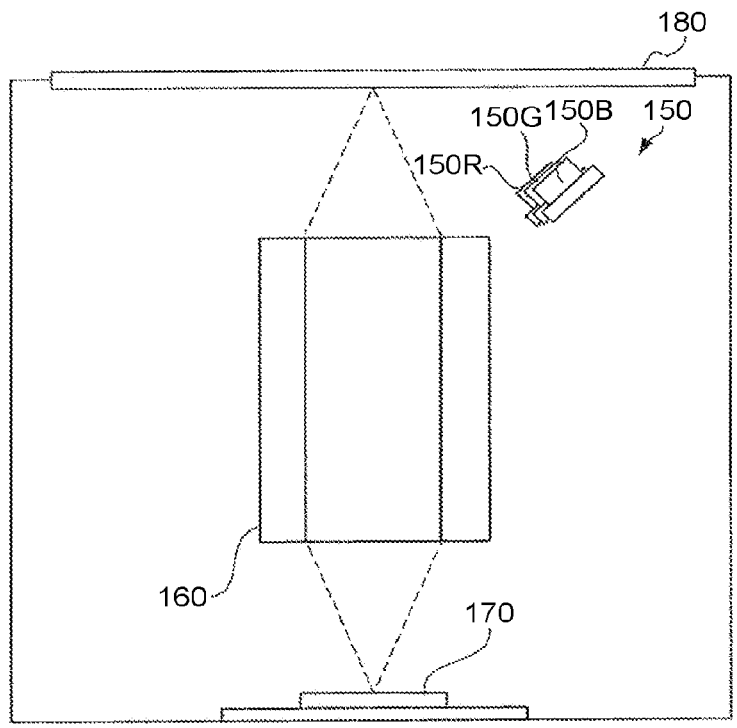
FIG. 3 is a schematic diagram of a configuration of a reading unit in the image reading device according to the embodiment of the present invention.

FIG. 2 is a sectional view of a configuration of an image reading device of the image forming apparatus according to the present embodiment of the present invention, and FIG. 3 is a schematic diagram of a configuration of a reading unit in the image reading device.

As illustrated in FIG. 2, the image reading device 100 includes the contact glass 110, a reading unit 120, a drive motor 130, and a conveying belt 140.

As illustrated in FIG. 3, the reading unit 120 includes a light source 150 that irradiates a document D with light of different colors and includes polychrome light sources, or a red light source 150R, a green light source 150G, and a blue light source 150B as three primary colors in light, for example, an equal-magnification image forming lens 160, a one-line image sensor 170, and a cover glass 180.

The light source 150 serves as the light sources of the respective colors by controlling the lighting of a polychrome light source in a time division manner. As the light source 150, a combination of a white light source and an infrared light source, a combination of light sources of the three colors of red, green, and blue and an infrared light source, or the like can be set.

In the image reading device 100, the reading unit 120 is mounted on the conveying belt 140. The conveying belt 140 is driven by the drive motor 130. The drive of the drive motor 130 is controlled, whereby the reading unit 120 is driven in a reciprocating manner in the sub-scanning direction to read the document D. The drive motor 130 is a pulse motor, and a pulse number per second given to the pulse motor is controlled, whereby the moving speed of the conveying belt 140, that is, the moving speed of the reading unit 120 can be controlled.

During the reciprocating movement, the distance between the reading unit 120 and the document D is always constant to enable an image by the equal-magnification image forming lens 160 to be focused on the image sensor 170.

The drive motor 130 may be a DC motor. In this case, an encoder is mounted on the DC motor, and the DC motor is feedback controlled by an encoder signal output from the encoder by the rotation of the DC motor. A target moving speed compared with the encoder signal is changed to perform feedback control, whereby the moving speed of the conveying belt 140, that is, the moving speed of the reading unit 120 can be controlled.

Next, the following describes control of the image reading device.

Figure 4:
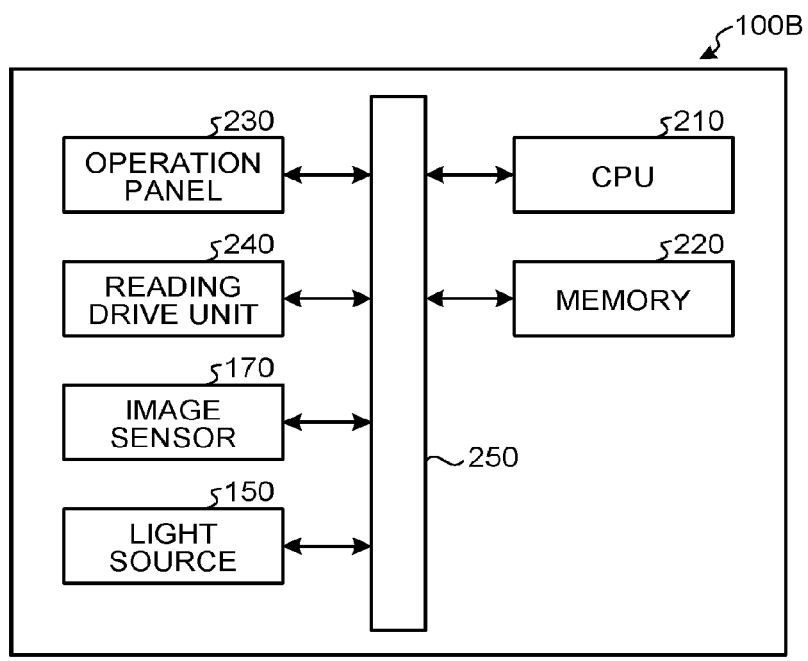
FIG. 4 is a block diagram of a controller of the image reading device according to the embodiment of the present invention.

FIG. 4 is a block diagram of a controller of the image reading device.

A controller 100B of the image reading device 100 includes the light source 150 described above, the image sensor 170, a central processing unit (CPU) 210 as a processor, a memory 220, an operation panel 230, and a reading drive unit 240. These units are connected with each other with a bus 250.

The memory 220 includes a volatile or non-volatile storage device such as a read only memory (ROM), a random access memory (RAM), an electrically erasable and programmable ROM (EEPROM), and a hard disk. The memory 220 stores therein computer programs such as a basic program of the image reading device 100 and an image reading program for executing a method for controlling image reading described below, system data required for executing these computer programs, and other data and is used as a work memory of the CPU 210.

The CPU 210 controls the units of the image reading device 100 based on the computer programs in the memory 220 to execute image reading basic processing.

The CPU 210 implements in the controller 100B functions of a moving speed changing unit that control the moving speed of the reading unit 120, a reading color number changing unit that changes the reading colors by the reading unit 120, that is, changes the reading colors, a selective lighting unit that selects which light source in the light source 150 is lit, and a color filter setting unit that drives a color filter switching device 194 described below to select a transmission part of a color filter 190.

The image reading device 100 reads the image reading program that executes the method for controlling image reading recorded in a computer-readable recording medium such as a ROM, an EEPROM, an EPROM, a flash memory, a flexible disk, a compact disc read only memory (CD-ROM), a compact disc rewritable (CD-RW), a digital versatile disc (DVD), a secure digital (SD) card, or a magneto-optical disc (MO), introduces the image reading program to the memory 220, and is thereby constructed as an image reading device that performs image reading described below at high speed.

This image reading program is a computer-executable program described in a legacy programming language such as assembler, C, C++, C#, or Java (registered trademark), an object-oriented programming language, or the like and can be stored and distributed in the recording medium.

The operation panel 230 includes various kinds of operation keys such as a start key and a function key and a display unit such as a liquid crystal display. The operation panel 230 receives input operation of various kinds of instructions required for causing the image reading device 100 to perform desired operation by the operation keys, and the display unit displays details of the various kinds of instructions input via the operation keys and various kinds of information to be reported from the image reading device 100 to a user. In particular, the operation panel 230 performs operation of various kinds of condition setting when the reading of the document D is performed in both-direction image reading described below, especially designation of the reading colors when the document is read or the like and displays various kinds of information in the document reading on the display unit.

The reading drive unit 240 includes the drive motor 130 and drives the reading unit 120 in the sub-scanning direction under the control of the CPU 210. In other words, the image reading device 100 includes the contact glass 110 on which the document D to be read is set, and the reading unit 120 arranged below the contact glass 110 is arranged so as to be able to move in the sub-scanning direction.

In reading the document D, the reading drive unit 240 first moves the reading unit 120 to a preset home position of the image reading device 100.

The reading unit 120 is then moved while being accelerated from the home position to an outgoing path reading starting position (normally a leading end of the document), and outgoing path direction movement that causes the reading unit 120 to reach an outgoing path reading ending position (normally a rear end of the document) from the outgoing path reading starting position at constant speed is performed.

The reading drive unit 240 decelerates and stops the reading unit 120, reversely drives the motor, moves the reading unit 120 in a document leading end direction with the outgoing path reading ending position as a return path reading starting position at constant speed, performs return path direction movement with the outgoing path reading position as a return path reading ending position, and returns the reading unit 120 to the home position.

The lighting of the red light source 150R, the green light source 150G, and the blue light source 150B of the light source 150 arranged in the reading unit 120 is controlled by the CPU 210. In the reading unit 120, the image sensor 170 performs photoelectric conversion on reading light of the document D focused by the equal-magnification image forming lens 160 and outputs image data.

With this operation, the reading unit 120 reads a document image using one or a plurality of reading colors in a process of reciprocating relative to the document fixed onto the contact glass 110, and when a plurality of reading colors are used, reads the document image while successively switching the reading colors in a process of moving.

Next, the following describes document reading operation in the image reading device 100.

Figure 5:
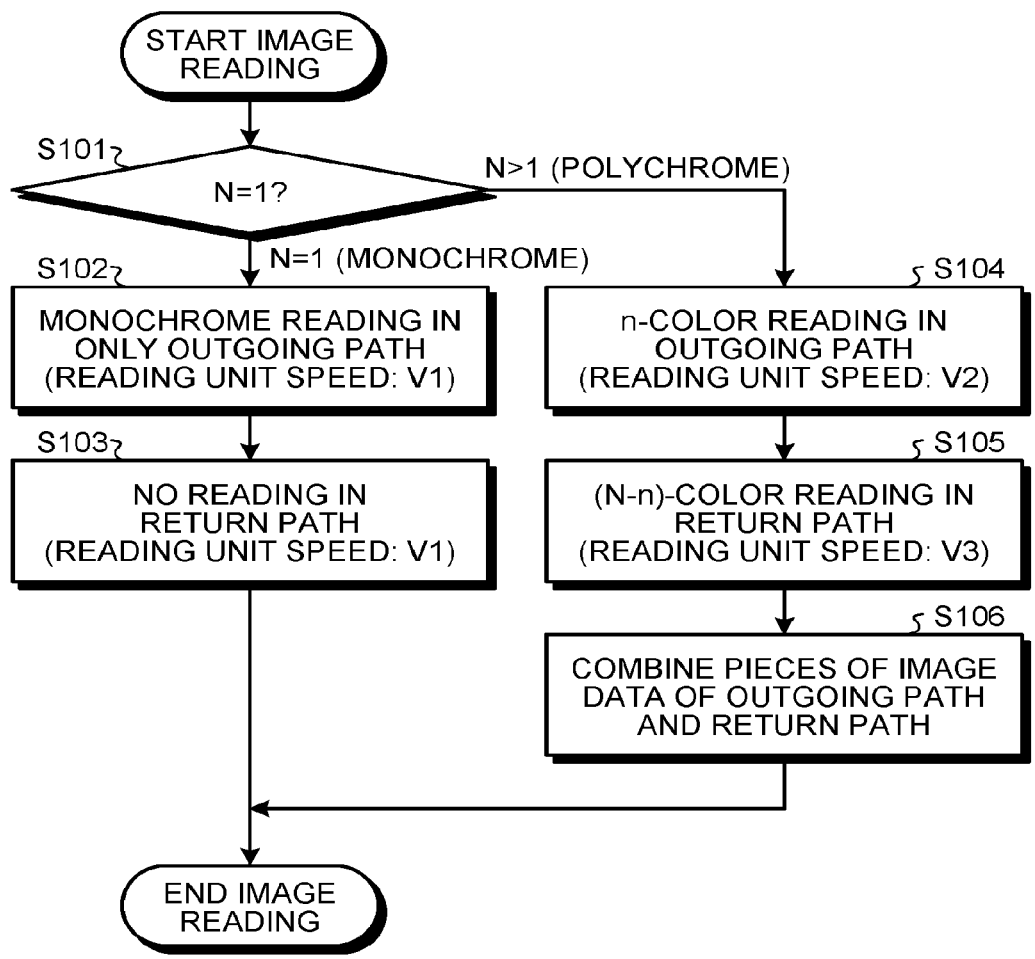
FIG. 5 is a flowchart of operation performed by the image reading device according to the embodiment of the present invention.
Figure 6:
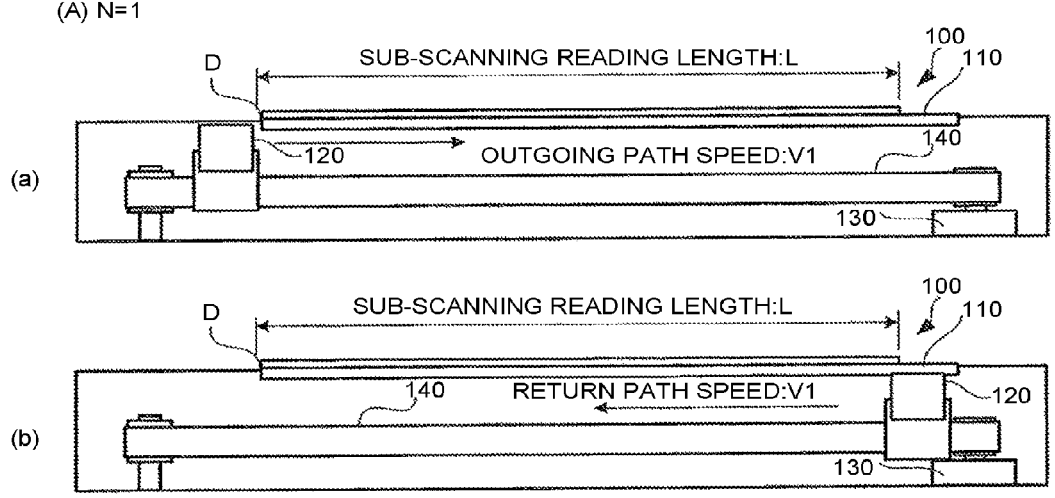
FIG. 6 is a schematic diagram of operation performed by the image reading device according to the embodiment of the present invention.
Figure 6:
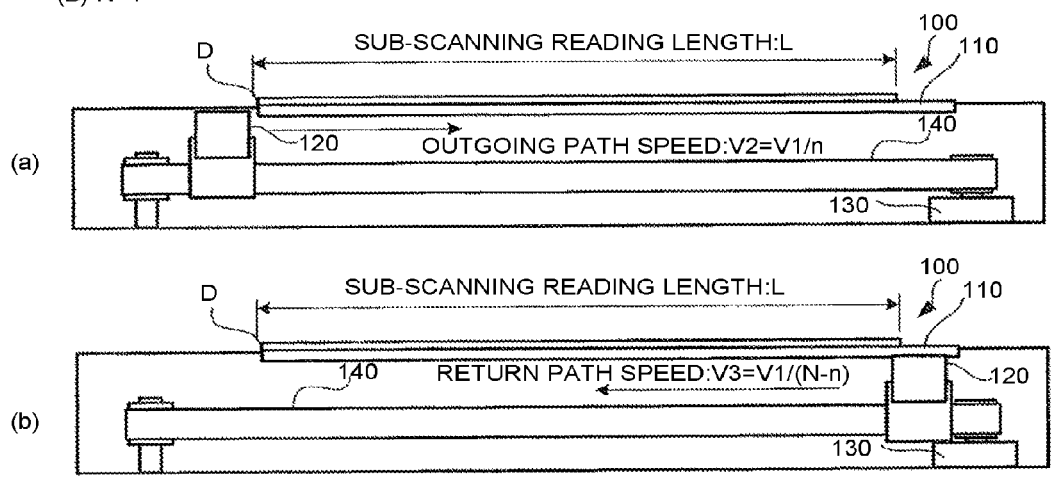

FIG. 5 is a flowchart of operation performed by the image reading device, and FIGS. 6(A)(a), 6(A)(b), 6(B)(a), and 6(B)(b) are schematic diagrams of the operation performed by the image reading device.

When image reading is started, the reading unit 120 sets a color information number of image data to be read first. In this example, concerning the color information number N, whether N=1 or N>1 is designated (Step S101).

If N=1, in the outgoing path, the reading unit 120 acquires image data while moving at a first moving speed V1 as illustrated in FIG. 6(A)(a).

In the return path, while the reading unit 120 moves at the first moving speed V1 (Step S102) as illustrated in FIG. 6(A)(b), no image data is acquired in the duration (Step S103). In this situation, the light source 150 can perform reading with white light by lighting all the red light source 150R, the green light source 150G, and the blue light source 150B and can also perform reading with light of a desired color by lighting a monochrome light source or lighting a plurality of selected light sources. When the light source contains an infrared light source, reading with infrared rays can be performed.

If N>1, in the outgoing path, the reading unit 120 reads n-color image data while successively switching the reading colors in a process of moving at a second moving speed V2 as a document image as illustrated in FIG. 6(B)(a) (Step S104). The second moving speed V2=V1/n.

In the return path, the reading unit 120 reads (N−n)-color image data while successively switching the reading colors in a process of moving at a third moving speed V3 as a document image as illustrated in FIG. 6(B)(b) (Step S105). The third moving speed V3=V1/(N−n).

The reading unit 120 combines the pieces of image data acquired in the outgoing path and the return path as N-color document image data (Step S106).

With this operation, based on the number "N" (N is a positive integer) of the reading colors, the moving speeds of the reading unit 120 in the outgoing path and the return path can be changed, and based on the number "N" of the reading colors, the reading color numbers of the reading unit 120 in the outgoing path and the return path can be changed.

Second Embodiment

Next, the following describes an image reading device according to a second embodiment.

Figure 7:
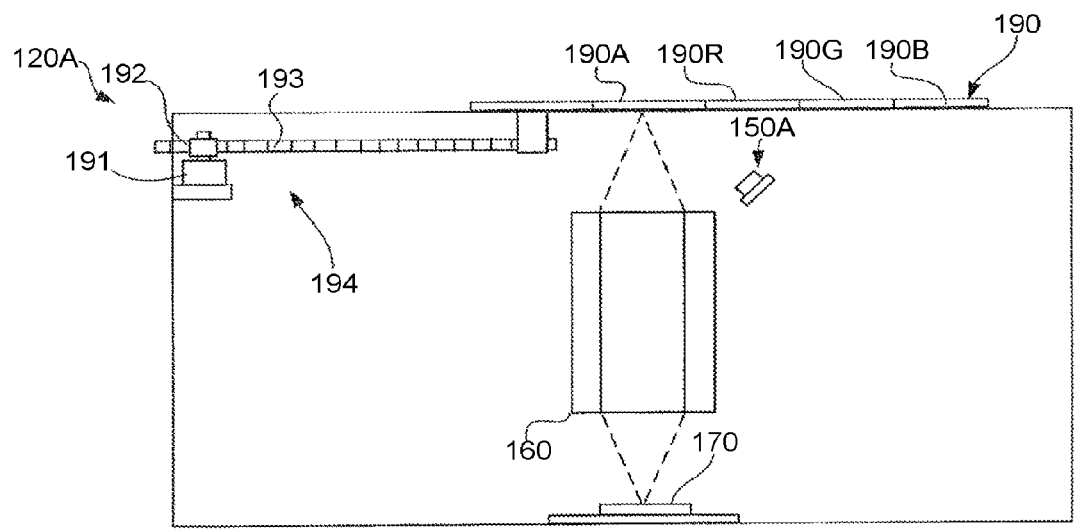
FIG. 7 is a schematic diagram of a configuration of a reading unit in an image reading device according to a second embodiment of the present invention.
Figure 7:
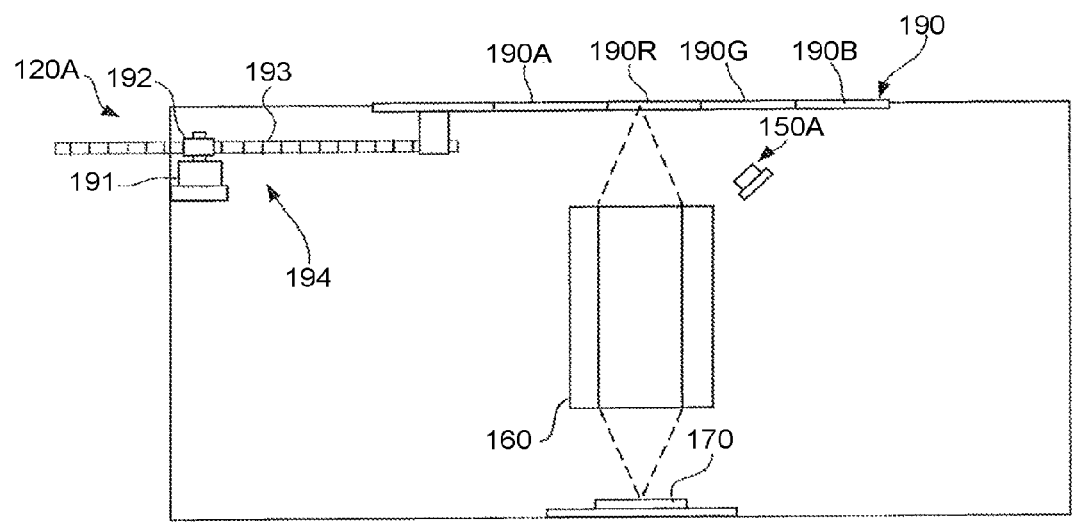

In the present embodiment, the document D is irradiated with light obtained by passing white light from the light source through a color filter. FIGS. 7(a) and 7(b) are schematic diagrams of a configuration of a reading unit in an image reading device according to a second embodiment of the present invention.

As illustrated in FIGS. 7(a) and 7(b), this reading unit 120A of the image reading device according to the second embodiment includes a white light source 150A that irradiates the document with white light, the equal-magnification image forming lens 160, the image sensor 170, and the color filter 190.

With this configuration, in the reading unit 120A, the color filter 190 having polychrome spectroscopic characteristics is moved by a color filter switching device 194, the white light from the white light source 150A is successively passed through the filter to switch the reading colors, and polychrome image data is obtained.

The color filter 190 includes a red transmission part 190R, a green transmission part 190G, a blue transmission part 190B, and a whole transmission part 190A that are arranged in a row. In the present embodiment, the color filter switching device 194 includes a motor 191, a pinion 192, and a rack 193. In order for the light from the white light source 150A to successively pass through the different transmission parts of the color filter 190, the rotation of the motor 191 is transmitted to the pinion 192 to adjustably drive the position of the rack 193. With this operation, the color filter switching device 194 moves the filter to switch a filter through which light can pass, and white light reflected by the document successively passes through the filter and enters the image sensor 170, whereby the image sensor 170 can output image data based on each desired reading color.

Third Embodiment

Next, the following describes a third embodiment of the present invention.

The image reading device 100 according to the third embodiment can selectively perform reading in a normal mode including the monochrome image data acquisition and the polychrome image data reading by the first embodiment or the second embodiment and precise reading of image data. Selection of the normal mode and the precise mode can be performed from the operation panel 230.

Figure 8:
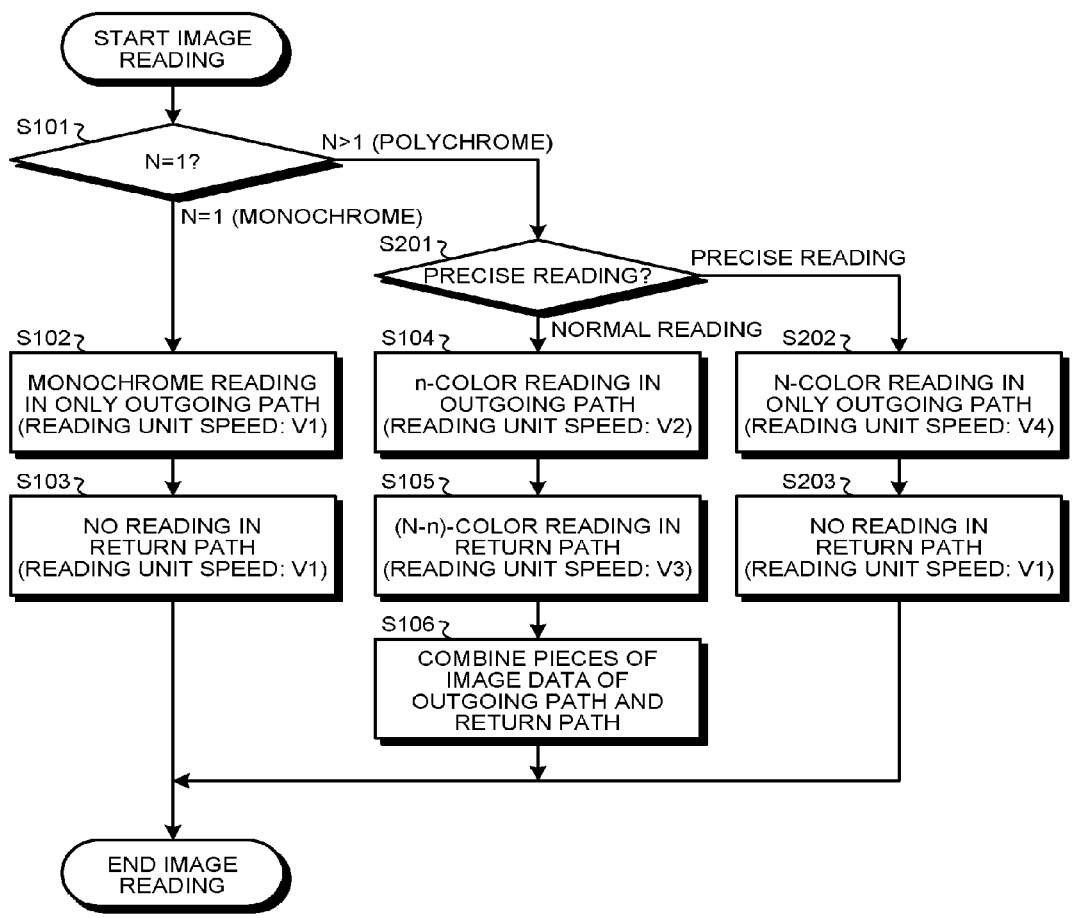
FIG. 8 is a flowchart of operation performed by an image reading device according to a third embodiment of the present invention.

FIG. 8 is a flowchart of operation performed by the image reading device according to the third embodiment of the present invention.

When image reading is started, the reading unit 120 sets, concerning the color information number N of image data to be read first, N=1 or N>1 (Step S101). This setting is performed by a user from the outside, that is, from the operation panel 230.

If N=1 indicating monochrome, the reading unit 120 acquires image data while moving at the first moving speed V1 in the outgoing path (Step S102) and moves at the first moving speed V1 in the return path but acquires no image data in this duration (Step S103).

If N>1 indicating polychrome, the reading unit 120 determines which of the precise reading mode or the normal reading mode is set by the user (Step S201). If the normal mode is set, the reading unit 120 performs the same processing as the case when N>1 in the first embodiment (Steps S104, S105, and S106). If the precise reading mode is selected, the reading unit 120 reads a document image while successively switching the reading colors in a process of moving at a fourth moving speed V4 and thereby acquires all pieces of N-color image data in the outgoing path (Step S202) and moves at the first moving speed V1 but acquires no image data in the return path (Step S203). The fourth moving speed is controlled so that V4=V1/N.

Next, the following describes the reading speed of the image reading device according to the above-described embodiments.

FIGS. 9(a), 9(b), and 9(c) are diagrams illustrating the speed of the reading unit of the image reading device.

In general, a one-line reading time in a main-scanning direction is a time determined by the performance of an image sensor, that is, the number of pixels, a data transfer speed, or the like.

The resolution in the sub-scanning direction is determined by the one-line reading time and a sub-scanning direction moving speed. Consequently, when the moving speed of the reading unit 120 is V1 in reading one-color (N=1) image data, the resolution in the sub-scanning direction will degrade than the one-color image data unless the moving speed of the reading unit for reading two-color image data is reduced to half V1 or lower.

For a larger number of color information desired to be acquired of image data, the moving speed of the reading unit 120 is required to be reduced to prevent degradation of the resolution, such as a ⅓ moving speed of V1 for three colors or a ¼ moving speed of V1 for four colors (1/X of V1 for X colors). In the normal reading processing of the first embodiment, the second embodiment, and the third embodiment, when N>1, the reading unit 120 reads the n-color image data at the second moving speed V2 in the outgoing path and reads the (N−n)-color image data at the third moving speed V3 in the return path. The reading unit 120 combines the pieces of image data in the outgoing path and the return path with each other as the N-color document image data.

Figure 9:
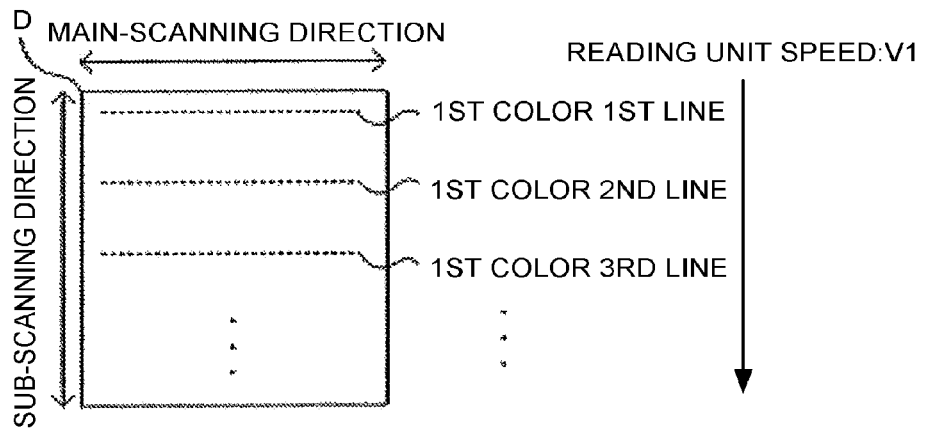
FIG. 9 is a diagram illustrating the speed of a reading unit of the image reading device according to the third embodiment of the present invention.
Figure 9:
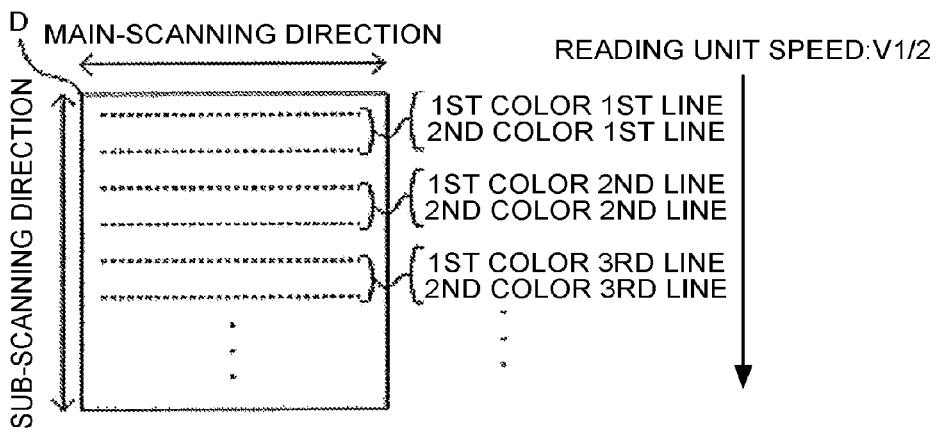
Figure 9:
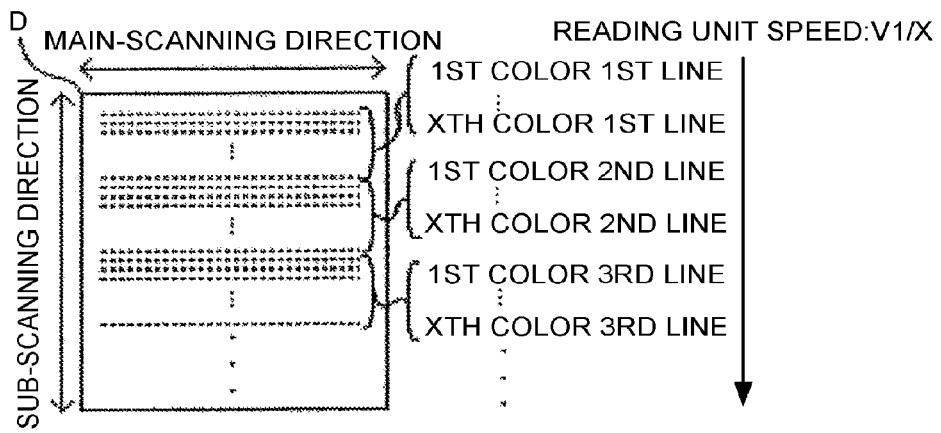

Consequently, as illustrated in FIG. 9, the second moving speed V2 is V2=V1/n, and the third moving speed is V3=V1/(N−n).

The reading time in this situation is compared with a reading time of a comparative example.

Figure 10:
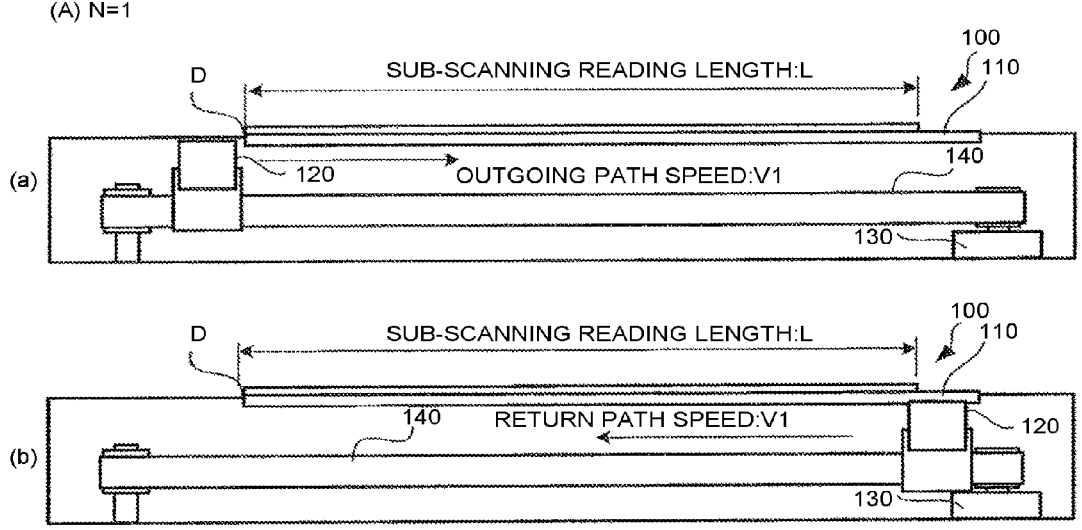
FIG. 10 is a diagram of operation performed by an image reading device according to a comparative example.
Figure 10:
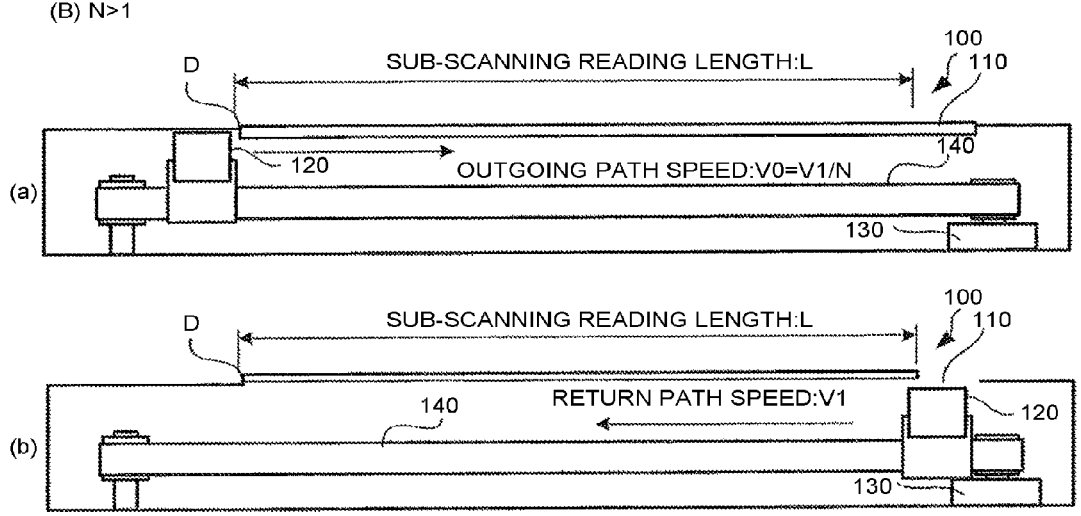

FIG. 10 is a diagram of operation performed by an image reading device according to a comparative example.

In the comparative example, as illustrated in FIG. 10(A) (a), with a scanning speed: V1 for reading one-color image data from a document as a maximum speed, when reading N-color image data (N is an integer>1) from the document, reading is generally performed with V1/N as a scanning speed V0.

In this case, however, reading productivity when reading by N colors is lower than reading productivity when reading by one color.

To verify this, a comparison will be made between an image reading time TR0 of the image reading device according to a reference example and an image reading time TR1 of the image reading device 100 according to the present embodiment where the length of the document in the sub-scanning direction is L and N>1.

The image reading times are the following respective values, from which it is revealed that the image reading time TR1 according to the present embodiment is shorter than the image reading time TR0 of the comparative example by a maximum of L/V1.

$$TR0=L/V0+L/V1=L/(V1/N)+L/V1=N\times(L/V1)+L/V1$$

$$TR1=L/V2+L/V3=L/(V1/n)+L/(V1/(N-n))=n\times(L/V1)+N\times(L/V1)-n\times(L/V1)=N\times(L/V1)$$

As described above, a larger length L of the document in the sub-scanning direction or a lower first moving speed V1 gives a larger time difference. The image reading device according to the third embodiment includes the precise reading mode that can read all-color image data at the fourth moving speed V4 in only the outgoing path also when N>1. Consequently, the fourth moving speed is V4=V1/N, whereby image quality degradation caused by deviation of pieces of image position information in outgoing path reading and return path reading caused by the influence of minute tolerances of components can be prevented, although a longer image reading time is required. With this operation, when image quality is given a higher priority over the image reading time, a high-quality image is provided.

The image reading devices according to the first embodiment and the second embodiment enable a user to select color information to be read and do not perform unnecessary light source switching or color filter switching, whereby the image reading time can be reduced.

Modification

The reading unit 120A of the image reading device according to the second embodiment of the present invention includes the white light source 150A that irradiates the document with the white light, the equal-magnification image forming lens 160, the image sensor 170, and the color filter 190 as illustrated in FIGS. 7(a) and 7(b), the color filter switching device 194 includes the motor 191, the pinion 192, and the rack 193, and the color filter 190 is configured so that the rotation of the motor 191 will be transmitted to the pinion 192 to adjustably drive the position of the rack 193 in order for the light from the white light source 150A to successively pass through the different transmission parts. The present invention is not limited to the configuration. In other words, with the color filter switching device and the color filter 190 arranged immediately in front of the image sensor 170, the color filter switching device 194 may move the filter to switch the filter through which light can pass, and the white light reflected by the document may be caused to pass through the equal-magnification image forming lens 160, successively pass through the filters, and enter the image sensor 170. With this configuration, the image sensor 170 can output image data based on each desired reading color.

Configurations, Actions, and Effects of Examples of Modes of the Present Invention First Mode The image reading device 100 according to the present mode includes the reading unit 120 that, in a process of reciprocating relative to the fixed document D, reads a document image using one or a plurality of reading colors, and when a plurality of reading colors are used, reads the document image while successively switching the reading colors in a process of moving, the drive motor 130 and the conveying belt 140 that move the reading unit 120, and the controller 100B including the memory 220 and the CPU 210 that changes the moving speeds of the reading unit 120 in the outgoing path and the return path based on the number "N" (N is a positive integer) of the reading colors by the reading unit 120 and changes the reading color numbers of the reading unit 120 in the outgoing path and the return path based on the number "N" of the reading colors.

According to the present mode, the controller 100B changes the moving speeds of the reading unit 120 based on the number "N" of the reading colors by the reading unit 120 in the outgoing path and the return path and changes the reading color numbers of the reading unit 120 in the outgoing path and the return path based on the number "N" of the reading colors. With this operation, the image reading device 100 can read images at high speed while reducing degradation of image quality.

Second Mode

The reading unit 120 of the image reading device 100 according to the present mode is the image sensor 170 that reads a one-line image.

According to the present mode, the image sensor 170 of the reading unit 120 reads the one-line image. With this operation, a price increase of the image sensor 170 can be reduced.

Third Mode

The image reading device 100 according to the present mode includes the light source 150 that includes the red light source 150R, the green light source 150G, and the blue light source 150B and irradiates the document D with light of different colors, and the controller 100B selects a light source of a designated color from the light source 150 and successively lights the light sources.

According to the present mode, the controller 100B selects a light source of a designated color from the light source 150 including the red light source 150R, the green light source 150G, and the blue light source 150B and successively lights the light sources. With this operation, the image sensor 170 can output image data based on each desired reading color.

Fourth Mode

The image reading device 100 according to the present mode includes the white light source 150A that irradiates the document D with white light and includes the color filter 190 including the whole transmission part 190A, the red transmission part 190R, the green transmission part 190G, and the blue transmission part 190B and the color filter switching device 194 that selects a certain color filter from the color filter 190 and successively passes light from the light source.

According to the present mode, the color filter switching device 194 enables the light from the white light source 150A to successively pass through any transmission part. With this operation, the image sensor 170 can output image data based on each desired reading color.

Fifth Mode

The image reading device 100 according to the present mode sets the speed of reading image data by the reading unit 120 in the outgoing path or the return path to the first moving speed V1 when the number "N" of the reading colors is one and reads n-color image data (N>n: n is a positive integer) at the second moving speed V2, which satisfies "V1/n," in the outgoing path and reads (N−n)-color image data at the third moving speed V3, which satisfies "V1/(N−n)," in the return path when the number "N" of the reading colors is two or more by the controller 100B.

According to the present mode, the reading unit 120 is moved at the first moving speed V1 when N is one, and the n-color image data is read at the second moving speed V2, which satisfies "V1/n," in the outgoing path, and the (N−n)-color image data is read at the third moving speed V3, which satisfies "V1/(N−n)," in the return path when N is two or more. With this operation, the reading speed of the reading unit 120 is optimized, and an image can be read at high speed while reducing degradation of image quality.

Sixth Mode

The image reading device 100 according to the present mode causes the controller 100B to enable the reading unit 120 to be set to the precise reading mode in which the reading unit 120 moves at the fourth moving speed V4, which satisfies "V1/N," to read N-color image data in only the outgoing path.

According to the present mode, as the precise reading mode, the reading unit 120 moves at the fourth moving speed V4, which satisfies "V1/N," to read the N-color image data in only the outgoing path. With this operation, image quality degradation caused by deviation of pieces of image position information in outgoing path reading and return path reading caused by the influence of minute tolerances of components can be prevented.

Seventh Mode

The image reading device 100 according to the present mode can set the number "N" of reading colors from the operation panel 230.

According to the present mode, the number of reading colors can be changed from the operation panel 230. With this configuration, a document can be read with an optimum number of reading colors desired by an operator.

Eighth Mode

An image forming apparatus 600 according to the present mode includes the image reading device 100 and an image formation unit 420 that forms an image on a recording medium based on an image acquired by the image reading device 100.

According to the present mode, the image formation unit 420 of an image forming apparatus main body 400 can perform image formation on the recording medium based on the image read by the image reading device 100.

Consequently, the image reading device 100 and the image forming apparatus main body 400 can configure a copier that involves less degradation of image quality and operates at high speed.

Ninth Mode

A method for controlling reading according to the present mode is a method for controlling reading by an image reading device including the reading unit 120 that, in a process of reciprocating relative to a fixed document, reads a document image using one or a plurality of reading colors, and when a plurality of reading colors are used, reads the document image while successively switching the reading colors in a process of moving and also including the drive motor 130 and the conveying belt 140 that move the reading unit 120. The method executes a first changing step (Steps S104 and S105) that changes moving speeds of the image reading unit in the outgoing path and the return path based on the number "N" (N is a positive integer) of the reading colors by the image reading unit and a second changing step (Steps S104 and S105) that changes reading color numbers of the image reading unit in the outgoing path and the return path based on the number "N" of the reading colors.

According to the present mode, the moving speed is changed based on the number "N" of the reading colors of an image to be read by the reading unit 120 in the outgoing path and the return path. With this operation, the image reading device 100 can read images at high speed while reducing degradation of image quality.

Tenth Mode

The present mode is an image reading program that causes the CPU 210 of the image reading device 100 including the image reading unit that, in a process of reciprocating relative to a fixed document, reads a document image using one or a plurality of reading colors, and when a plurality of reading colors are used, reads the document image while successively switching the reading colors in a process of moving and also including the moving unit that moves the image reading unit, the image reading device reading an image while changing moving speeds of the image reading unit in the outgoing path and the return path based on the number "N" (N is a positive integer) of the reading colors by the image reading unit to selectively execute at least one piece of processing of first reading processing (Step S102) that moves the image reading unit at the first moving speed V1 to read an image in only either of the outgoing path or the return path when the number "N" of the reading colors is one, second reading processing (Step S105) that moves the image reading unit at a second moving speed V2 that satisfies "V1/n" (N>n: n is a positive integer) (Step S104) to read an n-color image in the outgoing path and moves the image reading unit at the third moving speed V3, which satisfies "V1/(N−n)," to read an (N−n)-color image in the return path when the number "N" of the reading colors is two or more, and third reading processing (Step S202) that moves the image reading unit at the fourth moving speed V4, which satisfies "V1/N," to read an N-color image in only the outgoing path.

According to the present mode, the control of the CPU 210 changes the moving speed based on the number "N" of the reading colors of an image to be read by the reading unit 120 in the outgoing path and the return path. With this operation, the image reading device 100 can read images at high speed while reducing degradation of image quality.

According the embodiments of the present invention, it is possible to read images at high speed while reducing degradation of image quality.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image reading device, comprising:
an image reader configured to, in a process of reciprocating relative to a fixed document, read a document image using one or a plurality of reading colors, and when a plurality of reading colors are used, read the document image while successively switching the reading colors in a process of moving;
a moving unit including a motor and configured to move the image reader; and
processing circuitry configured to
change moving speeds of the image reader in an outgoing path and a return path based on a number N (where N is a positive integer) of the reading colors by the image reader, and
change reading color numbers of the image reader in the outgoing path and the return path based on the number N of the reading colors,
wherein the processing circuitry is further configured to set a speed of reading image data in the outgoing path or the return path to a first moving speed V1 when the number N of the reading colors is one, and reads n-color image data (where N>n and n is a positive integer) at a second moving speed V2 that satisfies V1/n in the outgoing path and reads (N−n)-color image data at a third moving speed V3 that satisfies V1/(N−n) in the return path when the number N of the reading colors is two or more.

2. The image reading device according to claim 1, wherein the image reader includes an image sensor that reads a one-line image.

3. The image reading device according to claim 1, further comprising a polychrome light source configured to irradiate the document with light of different colors, wherein
the processing circuitry is further configured to select a light source of a designated color from the polychrome light source and successively light the light sources.

4. The image reading device according to claim 1, further comprising a light source configured to irradiate the document with white light, and a plurality of color filters having different spectroscopic characteristics,
wherein the processing circuitry is further configured to select a certain color filter from the plurality of color filters, and the white light from the light source passes through the selected filter.

5. The image reading device according to claim 1, wherein a precise reading mode is set in which the image reader moves at a fourth moving speed V4 that satisfies V1/N to read N-color image data in only the outgoing path.

6. The image reading device according to claim 1, wherein the number N of the reading colors is set from the outside.

7. An image forming apparatus comprising:
the image reading device of claim 1; and
an image forming device that forms an image on a recording medium based on an image acquired by the image reading device.

8. A method for controlling image reading performed by an image reading device, the image reading device including an image reader configured to, in a process of reciprocating relative to a fixed document, read a document image using one or a plurality of reading colors, and when a plurality of reading colors are used, read the document image while successively switching the reading colors in a process of moving, the method comprising:
  changing moving speeds of the image reader in an outgoing path and a return path based on a number N (where N is a positive integer) of the reading colors by the image reader; and
  changing reading color numbers of the image reader in the outgoing path and the return path based on the number N of the reading colors,
  wherein the step of changing the moving speeds includes setting a speed of reading image data in the outgoing path or the return path to a first moving speed V1 when the number N of the reading colors is one, and reads n-color image data (where N>n and n is a positive integer) at a second moving speed V2 that satisfies V1/n in the outgoing path and reads (N−n)-color image data at a third moving speed V3 that satisfies V1/(N−n) in the return path when the number N of the reading colors is two or more.

9. A non-transitory computer-readable medium comprising computer readable program codes, performed by an image reading device, the image reading device including an image reader configured to, in a process of reciprocating relative to a fixed document, read a document image using one or a plurality of reading colors, and when a plurality of reading colors are used, read the document image while successively switching the reading colors in a process of moving, the program codes when executed causing the image reading device to perform a method comprising:
  changing moving speeds of the image reader in an outgoing path and a return path based on a number N (where N is a positive integer) of the reading colors by the image unit; and
  changing reading color numbers of the image reader in the outgoing path and the return path based on the number N of the reading colors,
  wherein the step of changing the moving speeds includes setting a speed of reading image data in the outgoing path or the return path to a first moving speed V1 when the number N of the reading colors is one, and reads n-color image data (where N>n and n is a positive integer) at a second moving speed V2 that satisfies V1/n in the outgoing path and reads (N−n)-color image data at a third moving speed V3 that satisfies V1/(N−n) in the return path when the number N of the reading colors is two or more.

* * * * *